(12) United States Patent
Georgiou et al.

(10) Patent No.: US 9,959,465 B2
(45) Date of Patent: May 1, 2018

(54) DIFFRACTIVE OPTICAL ELEMENT WITH UNDIFFRACTED LIGHT EXPANSION FOR EYE SAFE OPERATION

(71) Applicant: Microsoft Technology Licensing, LLC, Redmond, WA (US)

(72) Inventors: Andreas Georgiou, Cambridge (GB); Joel Steven Kollin, Seattle, WA (US); Sing Bing Kang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 13/923,135

(22) Filed: Jun. 20, 2013

(65) Prior Publication Data

US 2014/0307307 A1     Oct. 16, 2014

Related U.S. Application Data

(60) Provisional application No. 61/812,232, filed on Apr. 15, 2013.

(51) Int. Cl.
*G02B 13/14* (2006.01)
*G02B 5/18* (2006.01)
(Continued)

(52) U.S. Cl.
CPC .......... *G06K 9/00536* (2013.01); *B29C 64/00* (2017.08); *B29C 64/386* (2017.08);
(Continued)

(58) Field of Classification Search
CPC .............. G02B 27/0944; G02B 5/0252; G02B 27/0927; G02B 5/1895; G02B 27/4205;
(Continued)

(56) References Cited

U.S. PATENT DOCUMENTS 5,471,326 A * 11/1995 Hall ..................... G02B 26/106
359/15
2005/0234527 A1* 10/2005 Slatkine ......................... 607/89
(Continued)

FOREIGN PATENT DOCUMENTS

CN         1244008 A      2/2000
CN       102231037 A     11/2011
(Continued)

OTHER PUBLICATIONS

Benjamin Langmann, Klaus Hartmann, and Otmar Loffeld. Depth Camera Technology Comparison and Performance Evaluation. ICPRAM 2012.*

(Continued)

*Primary Examiner* — William R Alexander
*Assistant Examiner* — Collin X Beatty (57) ABSTRACT

Aspects of the subject disclosure are directed towards safely projecting a diffracted light pattern, such as in an infrared laser-based projection/illumination system. Non-diffracted (zero-order) light is refracted once to diffuse (defocus) the non-diffracted light to an eye safe level. Diffracted (non-zero-order) light is aberrated twice, e.g., once as part of diffraction by a diffracting optical element encoded with a Fresnel lens (which does not aberrate the non-diffracted light), and another time to cancel out the other aberration; the two aberrations may occur in either order. Various alternatives include upstream and downstream positioning of the diffracting optical element relative to a refractive optical element, and/or refraction via positive and negative lenses.

20 Claims, 6 Drawing Sheets

(51) Int. Cl.
| | |
|---|---|
| G02B 27/44 | (2006.01) |
| G06K 9/00 | (2006.01) |
| H04N 5/33 | (2006.01) |
| G06K 9/62 | (2006.01) |
| G06F 11/30 | (2006.01) |
| G06F 3/06 | (2006.01) |
| G06F 9/30 | (2018.01) |
| G06F 12/02 | (2006.01) |
| G06F 12/00 | (2006.01) |
| B29C 64/386 | (2017.01) |
| H04N 13/02 | (2006.01) |
| H04N 13/00 | (2018.01) |
| G02B 27/42 | (2006.01) |
| H04N 5/225 | (2006.01) |
| H04N 9/04 | (2006.01) |
| H04N 17/00 | (2006.01) |
| G01B 11/25 | (2006.01) |
| G01B 11/22 | (2006.01) |
| G06T 1/60 | (2006.01) |
| G06T 7/00 | (2017.01) |
| G06T 7/586 | (2017.01) |
| B29C 64/00 | (2017.01) |
| A63F 13/213 | (2014.01) |

(52) U.S. Cl.
CPC .............. *G01B 11/22* (2013.01); *G01B 11/25* (2013.01); *G01B 11/2513* (2013.01); *G01B 11/2527* (2013.01); *G01B 11/2545* (2013.01); *G02B 5/1895* (2013.01); *G02B 27/4205* (2013.01); *G02B 27/44* (2013.01); *G06F 3/0653* (2013.01); *G06F 3/0659* (2013.01); *G06F 3/0683* (2013.01); *G06F 9/3004* (2013.01); *G06F 9/30043* (2013.01); *G06F 9/30127* (2013.01); *G06F 11/3024* (2013.01); *G06F 12/00* (2013.01); *G06F 12/02* (2013.01); *G06F 12/0207* (2013.01); *G06F 12/0292* (2013.01); *G06K 9/0063* (2013.01); *G06K 9/00201* (2013.01); *G06K 9/62* (2013.01); *G06T 1/60* (2013.01); *G06T 7/00* (2013.01); *G06T 7/586* (2017.01); *H04N 5/2256* (2013.01); *H04N 5/33* (2013.01); *H04N 5/332* (2013.01); *H04N 9/045* (2013.01); *H04N 13/0022* (2013.01); *H04N 13/02* (2013.01); *H04N 13/025* (2013.01); *H04N 13/0239* (2013.01); *H04N 13/0253* (2013.01); *H04N 13/0271* (2013.01); *H04N 17/002* (2013.01); *A63F 13/213* (2014.09); *G02B 27/4233* (2013.01); *G06T 2207/30244* (2013.01); *H04N 2013/0081* (2013.01)

(58) Field of Classification Search
CPC .................. G02B 27/44; A61B 18/203; A61B 2018/2261; G01B 11/2545; G01B 11/25; G01B 11/22; G01B 11/2513; G01B 11/2527; G06F 3/0304; G06F 12/0207; G06K 9/00536; G06K 9/00201; G06K 9/0063; B29C 67/0051; G06T 1/60; G06T 7/00; G06T 7/004; G06T 7/0057; G06T 7/0065; G06T 7/0073; G06T 2207/30244; H04N 5/2256; H04N 5/33; H04N 5/332; H04N 9/045; H04N 13/0022; H04N 13/02; H04N 13/0239; H04N 13/025; H04N 13/0253; H04N 13/0271; H04N 17/002; H04N 2013/0081; A63F 13/002
USPC ................ 356/445, 601, 610, 625; 351/206; 348/47; 359/15; 385/10; 607/89
See application file for complete search history.

(56) References Cited

U.S. PATENT DOCUMENTS

| | | | |
|---|---|---|---|
| 2005/0257748 A1* | 11/2005 | Kriesel ................ A01K 11/008 119/51.02 |
| 2006/0291020 A1* | 12/2006 | Knox et al. .................... 359/15 |
| 2007/0253310 A1 | 11/2007 | Ikenaka | |
| 2008/0165357 A1* | 7/2008 | Stern et al. .................. 356/364 |
| 2009/0021750 A1* | 1/2009 | Korner et al. ................ 356/601 |
| 2009/0096783 A1* | 4/2009 | Shpunt .................. G01B 11/25 345/419 |
| 2010/0202725 A1* | 8/2010 | Popovich et al. ............. 385/10 |
| 2011/0310220 A1 | 12/2011 | McEldowney | |
| 2012/0120494 A1 | 5/2012 | Takayama | |
| 2013/0003069 A1* | 1/2013 | Umeda et al. ................ 356/445 |
| 2013/0265623 A1* | 10/2013 | Sugiyama et al. ............. 359/13 |
| 2014/0098342 A1* | 4/2014 | Webb ........................... 351/206 |
| 2014/0132501 A1* | 5/2014 | Choi et al. ................... 345/156 |
| 2014/0132728 A1* | 5/2014 | Verano et al. ................. 348/46 |
| 2014/0180639 A1* | 6/2014 | Cheatham, III ...... G06F 21/629 702/189 |
| 2014/0320605 A1* | 10/2014 | Johnson ........................ 348/47 |

FOREIGN PATENT DOCUMENTS

| | | |
|---|---|---|
| CN | 102362150 A | 2/2012 |
| CN | 102803894 A | 11/2012 |

OTHER PUBLICATIONS

"International Search Report & Written Opinion Issued in PCT Patent Application No. PCT/US2014/033917", dated Jul. 18, 2014, 10 Pages.
"International Preliminary Report on Patentability Issued in PCT Patent Application No. PCT/US2014/033917", dated Jul. 20, 2015, 8 Pages.
"Office Action Issued in European Patent Application No. 14724600.3", dated May 23, 2017, 5 Pages.
"First Office Action and Search Report Issued in Chinese Patent Application No. 201480021528.5", dated Dec. 11, 2017, 14 Pages.

\* cited by examiner

DIFFRACTIVE OPTICAL ELEMENT WITH UNDIFFRACTED LIGHT EXPANSION FOR EYE SAFE OPERATION

BACKGROUND

A known technique for active stereo camera sensing uses an infrared (IR) projected pattern in conjunction with one or more cameras capable of detecting IR. As higher resolution three-dimensional (3D) sensors are devised to operate at larger and larger field of views and distances, and with higher and higher resolutions, the total IR illumination power needs to increase.

IR lasers in conjunction with one or more diffractive optical elements (DOEs) have been used as power sources to produce such patterns. However, at such power levels, the intensity of the DOE's non-diffracted light (or zero-order light, usually a fixed fraction of total energy) is an eye-safety hazard.

One common way to reduce the intensity of the non-diffracted light is to have two spot-generating DOEs in a series. The first DOE creates the complex dot pattern, and the second one replicates it by a small number N×N, e.g., 3×3. As the non-diffracted light is a fixed ratio of the total power, (e.g., represented by $\alpha$), the final power of the non-diffracted light is $\alpha/N^2$. Thus, the second DOE effectively decreases the intensity power by the factor $N^2$. This resulting decrease in power is counter to the need for increased IR illumination power.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards an eye safe diffraction system generally based upon reducing the power of the non-diffracted light by introducing defocusing or other aberrations. In one aspect, a DOE set, compromising of one or more DOEs passes the undiffracted light (i.e. the zero order) unaffected while the diffracted light (i.e. non-zero order light) is diffracted to the desired light pattern. The DOE set is also configured to aberrate (e.g. focus, defocus, add a Zernike wavefront or any other arbitrary aberration) the diffracted light. A refractive optical element (ROE) optically coupled to the DOE set, aberrates refractivelly (e.g. focus, defocus, add a Zernike wavefront or any other arbitrary aberration) the undiffracted light and the diffracted light from the DOE set. The aberration introduced by the DOE set and the ROE are such that their total effect to the diffracted light is cancelled or substantially cancelled while the undiffracted light is only affected by the ROE.

In one aspect, a projection mechanism is configured to output a pattern of diffracted light spots, and to defocus non-diffracted light output therefrom. The projection mechanism comprises optically coupled components including a laser light source, a collimating lens, a refractive lens, and a diffractive optical element set comprising at least one diffractive element able to introduce aberrations to the beam (e.g. defocus by means of encoding a diffractive lens element, such as a diffractive Fresnel lens or Fresnel zone plate in the DOE) The refractive lens is configured to aberrate the non-diffracted light, and to cancel or substantially cancel abberations of the diffracted light spots by the diffractive element.

In one aspect, a diffractive optical element set is optically coupled with a refractive lens. The refractive lens defocuses and thus expands the non-diffracted light that is not diffracted by the diffractive optical element set, and cancels or substantially cancels focusing introduced to the diffracted light introduced by the diffractive optical element set.

Other aspects and advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a light pattern projection system that is eye safe. As is known with laser illumination, zero-order light is light not diffracted into the light pattern, referred to herein as non-diffracted light. Thus, if left as is, the non-diffracted light is dangerous to the eye. The technology described herein makes the non-diffracted light eye safe by expanding (e.g., defocusing) or blocking it, while leaving the projected diffracted light pattern substantially unchanged.

To this end, diffracted light is both aberrated diffractively and aberrated refractively in one stage, while non-diffracted light is not. Note that as used herein, "aberration" and the like are used in an optical sense, e.g., as a lower frequency change in the wavefront compared with the high frequencies introduced by the DOE, that can be encoded both on a diffractive element (DOE) and/or a refractive element (ROE), (and not to imply any unwanted/uncontrolled/negative effect on the system). In another (prior or subsequent) stage, both the diffracted light and the non-diffracted light are aberrated. In this other stage, the diffracted light is basically aberrated to cancel the prior or subsequent aberrations, such that overall after both stages the diffracted light is not aberrated overall. Because the non-diffracted light is only aberrated in this other stage, the non-diffracted light is aberrated and thus defocused to an eye safe level.

It should be understood that any of the examples herein are non-limiting. For instance, various arrangements of lenses are used as examples, however the technology described herein is not limited to these arrangements. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in optics, laser technology and light pattern projection in general.

Figure 1:
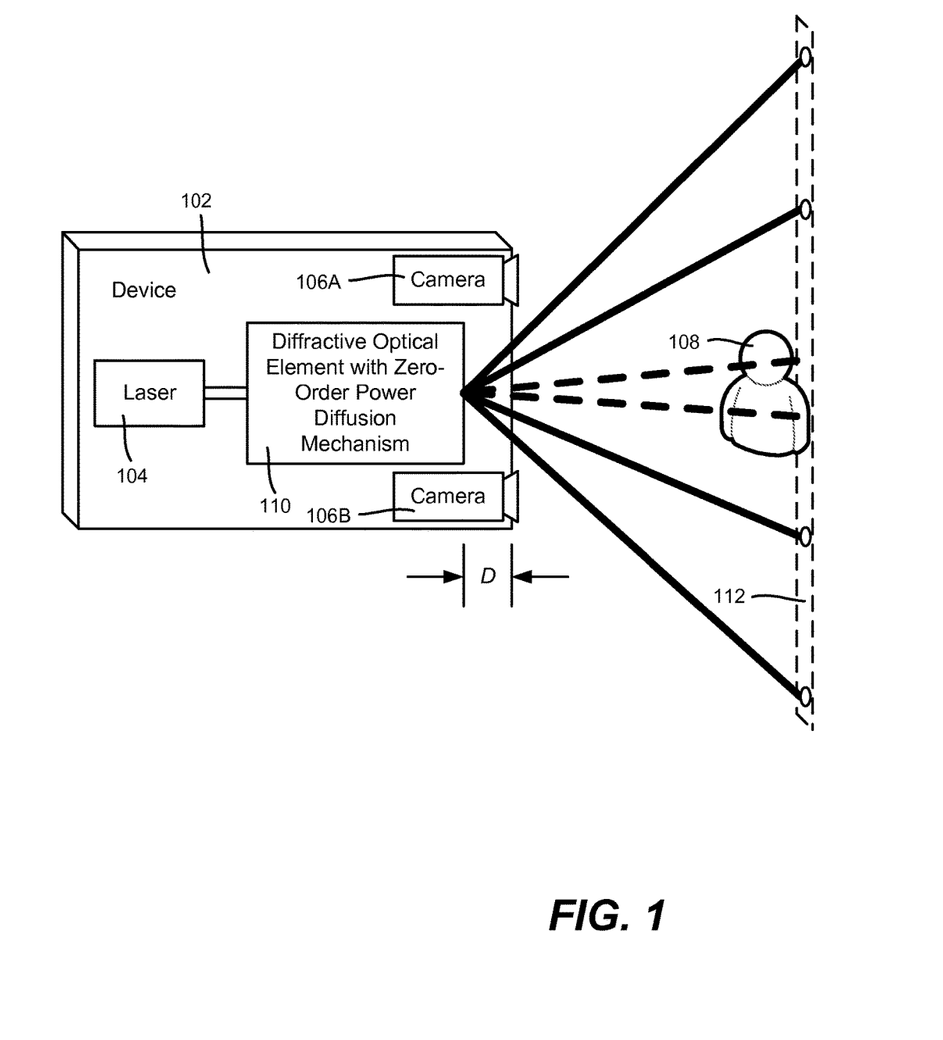
FIG. 1 is a block diagram representing example components of a device that projects diffracted light in a diffraction pattern while diffusing non-diffracted (zero-order) light, according to one example implementation.

FIG. 1 shows a generalized block diagram in which a device 102 such as a built into or part of a home entertainment device is configured with projection mechanism including a laser 104 to project light (e.g., IR) in an illumination pattern. The illumination pattern need not be evenly distributed, and indeed may change over time. Stereo cameras 106A and 106B capture the reflection from an illuminated person 108 (and/or other object) and use the captured images as desired; note that a single camera may be used in a given implementation.

For example, a structured illumination depth mapping system may use a light pattern to introduce geometric parallax that is then recorded by a number of cameras. One of the most efficient ways to illuminate a scene is by using a laser diode together with a diffractive optical element (DOE). Laser diodes are one of the most efficient ways to create light, and DOEs can create an arbitrary array of spots in the scene. However, as the distance, resolution and Field of View (FOV) of such systems increase, more light and thus a higher energy laser is needed to illuminate the scene.

Figure 2:
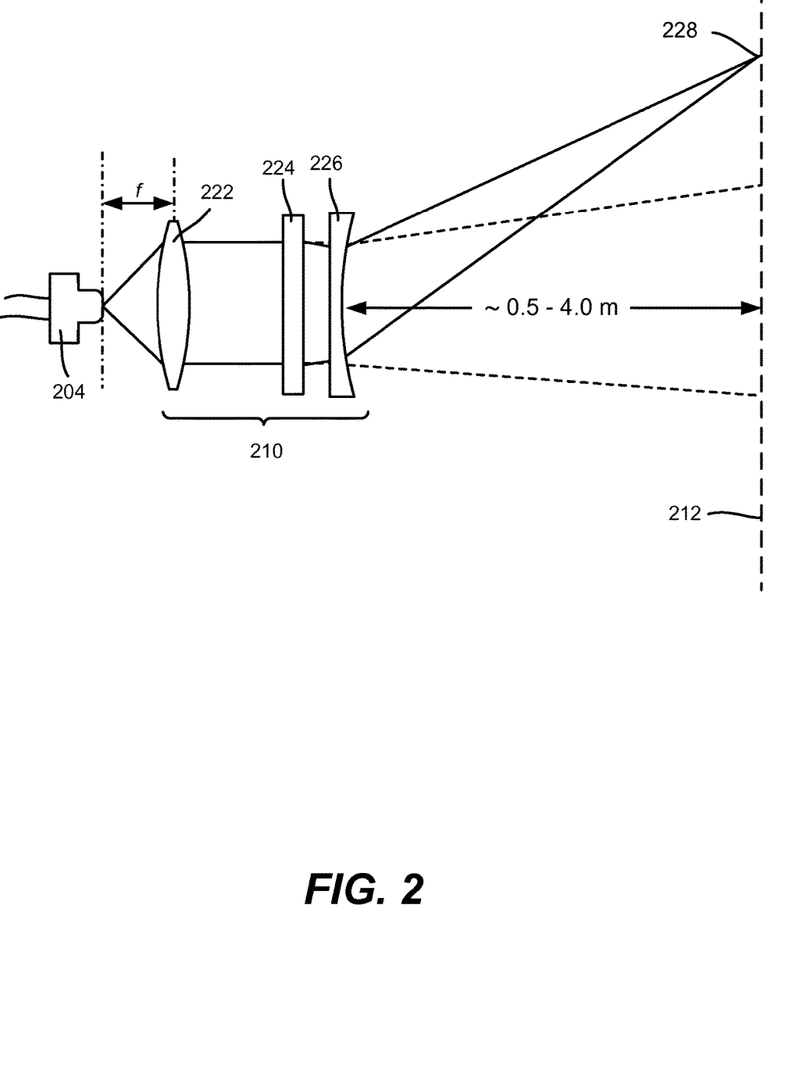
FIG. 2 is a representation of an arrangement of optical-related components, including a diffractive optical element and a downstream negative lens, in which the arrangement outputs a diffracted light pattern while expanding non-diffracted light based upon focusing, according to one example implementation.

As described herein, a diffractive optical element mechanism 110 disperses the laser light into a large number of spots (also referred to as dots regardless of any shape or size) in a desired pattern, such as on the order of 100,000 dots. Some of the pattern (e.g., four dots of the typically many thousand) is represented in FIG. 1 by the solid lines coming from the mechanism 110 and the dots on the image plane 112. Note that neither FIG. 1 nor its components, nor any of the figures or their components shown herein are intended to be to scale or convey any particular distance or relative sizes; however a typical distance from the image plane to the light source in one implementation is on the order of 0.5 to 4.0 meters (FIG. 2).

However, primarily due to fabrication inaccuracies in diffractive optical elements, some of the light referred to as non-diffracted light is not affected by a system's diffractive optical element. Although careful fabrication can reduce the power of the non-diffracted light to below one percent of the laser power, the non-diffracted light still may be above the eye safe limit/level. Given that the zero-order is a fixed ratio of the laser power, heretofore this put an upper limit on the allowed illumination power.

As described herein, the non-diffracted light is made eye safe. More particularly, the non-diffracted light is that which is not affected by the diffractive optical element, but it is affected by a normal refractive optical element (ROE), e.g., lens. Thus, described herein is combining a diffractive (e.g., positive) lens encoded in the diffractive optical element and a ROE (e.g., a negative lens) that cancels the diffractive lens, whereby the spots illuminating a scene remain unaffected, with the exception of the non-diffracted light. The non-diffracted light, because it is not affected by the diffractive lens, is only affected by the ROE; a negative lens defocuses the non-diffracted light to make it eye safe. Note that as used herein, the term "cancel" refers to canceling the effect of a previous "downstream" aberration, or proactively canceling the effect of a subsequent "upstream" aberration.

To this end, in addition to providing the dot pattern, as described herein the diffractive optical element with the mechanism 110 is configured to spread out the non-diffracted light. In three dimensions, the non-diffracted light is basically spread out into a wider cone, so that if the non-diffracted light enters the eye of the person 108, the energy of the non-diffracted light is distributed over a much larger area so that only a portion of the energy can enter the eye, thus providing for safety.

The spreading of the non-diffracted light is a function of distance, and thus some consideration is given to prevent someone from getting too close to the light output before the non-diffracted light can be sufficiently spread. For example, as shown in FIG. 1, a distance D from the light output to the nearest point a person's eye can be positioned may be provided, using any type of physical barrier, so that a person cannot get sufficiently close to the light output to damage the eye. The physical barrier may be provided by recessing the optics in the device, and/or via a tube or the like that physically increases the closest distance to the light output. Internal mirrors also may be used to increase the distance.

FIG. 2 is a side-view, two-dimensional representation that shows an implementation of components of an example diffractive optical element with a non-diffracted light expansion mechanism 210. The optical arrangement in this example embodiment comprises a laser 204, a positive collimating lens 222, a diffractive optical element 224 (encoded within a diffractive lens) and a ROE 226. Note that such a diffractive optical element 224 with a diffractive lens may be referred to as a hologram, and may be designed based upon the known algorithms such as Gerchberg Saxton algorithm, and fabricated using known techniques such as etching glass, embossing/molding plastic, and so forth.

The laser 204 and the collimating lens 222 makes the received light rays parallel; the focal length is represented by f. The light from the collimating lens 222 illuminates the diffractive optical element 224, which has a diffractive lens (such as a Fresnel zone plate) encoded thereon. The diffractive optical element 224 performs two functions. One function splits the beam into many weaker beams, and another function (via the encoded diffractive lens) introduces a (e.g., relatively slight) focusing power.

The negative ROE 226 cancels the focusing effect of the diffractive lens such that the net effect on the majority of the illumination spots is cancelled. Thus, for example, the spot corresponding to the point 228 is substantially positioned on the image plane 212 in FIG. 2 as if the diffractive optical element 224 did not include focusing power and there was no negative ROE.

However, the negative lens 226 does affect the non-diffracted light which was not affected by the diffractive optical element 224, namely, the negative lens 226 defocuses the non-diffracted light as represented in FIG. 2 by the dashed diverging lines. In other words, the non-diffracted light (not affected by the diffractive optical element 224) is also not affected by the diffractive lens, whereby the net effect is to remain unfocused after it leaves the optical arrangement.

The defocusing (and thus its width) of the non-diffracted light may be kept to the minimum permissible diameter by the eye safety limitations to minimize the strength of the diffractive lens and negative refractive lens. Notwithstanding, the strength of the diffractive lens and negative refractive lens can be varied as desired to control how quickly (in terms of distance) the non-diffracted light spreads out, so that, for example, the strength may be used to compensate for different implementation scenarios. Similarly, the size (diameters) of the lenses may be varied for safety, e.g., larger lenses spread the light energy over a larger area, e.g., such as larger than the eye pupil.

As can be seen, the lens arrangement of FIG. 2 overcomes one of the primary challenges in designing a DOE-laser projector, namely ensuring that the spots in the scene are eye safe. The majority of spots are made eye safe because of diffraction, while the non-diffracted light spot is made safe by the defocusing/diffusion as described herein.

Figure 3:
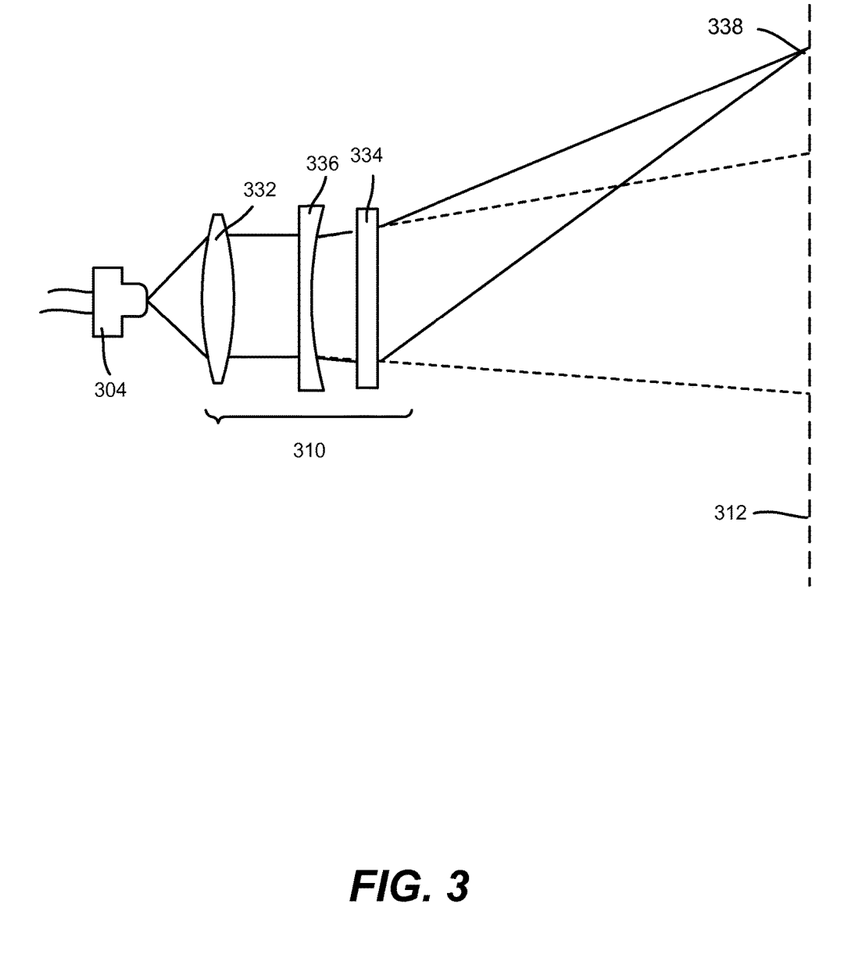
FIG. 3 is a representation of an arrangement of optical-related components, including upstream negative lens relative to a diffractive optical element, in which the arrangement outputs a diffracted light pattern while expanding non-diffracted light based upon focusing, according to one example implementation.

FIG. 3 shows an alternative embodiment similar to FIG. 2 except that in this arrangement 310, a negative lens 336 is placed in front of the diffractive optical element 334. The negative lens 336 spreads all light, including the non-diffracted light, however the diffractive optical element 334 refocuses the light (e.g., the dot 338 is refocused on the image plane 312) except for the non-diffracted light (represented by the diverging dashed lines) which continues to spread.

Figure 4:
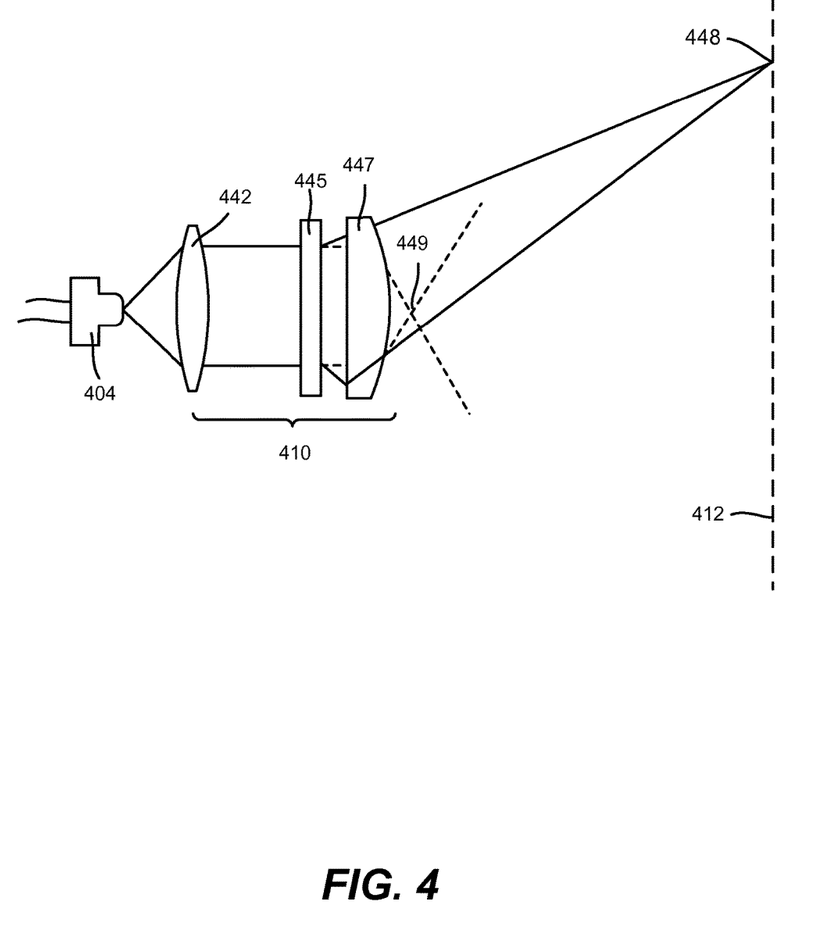
FIG. 4 is a representation of an arrangement of optical-related components, including a diffractive optical element and a downstream positive lens, in which the arrangement outputs a diffracted light pattern while expanding non-diffracted light based upon focusing, according to one example implementation

FIG. 4 shows another alternative embodiment, in which rather than defocusing the non-diffracted light via a negative lens, an arrangement 410 comprising a positive lens 447 focuses the non-diffracted light to a point 449 from which the non-diffracted light again begins to diverge/defocus. Note that to cancel the effect of the positive lens 447 on the diffracted dots, the diffractive optical element 445 includes (e.g., is encoded with) a negative lens that cancels the positive lens 447 for all light other than the non-diffracted light. In this way, the dots are refocused on the image plane 412, as represented by the converging solid lines/dot 448 in FIG. 4. A stop may be located at the point 449 to physically block the non-diffracted light from being projected further. For example, an opaque dot on an otherwise transparent surface may be positioned relative to point 449 to block the focused non-diffracted light.

Figure 5:
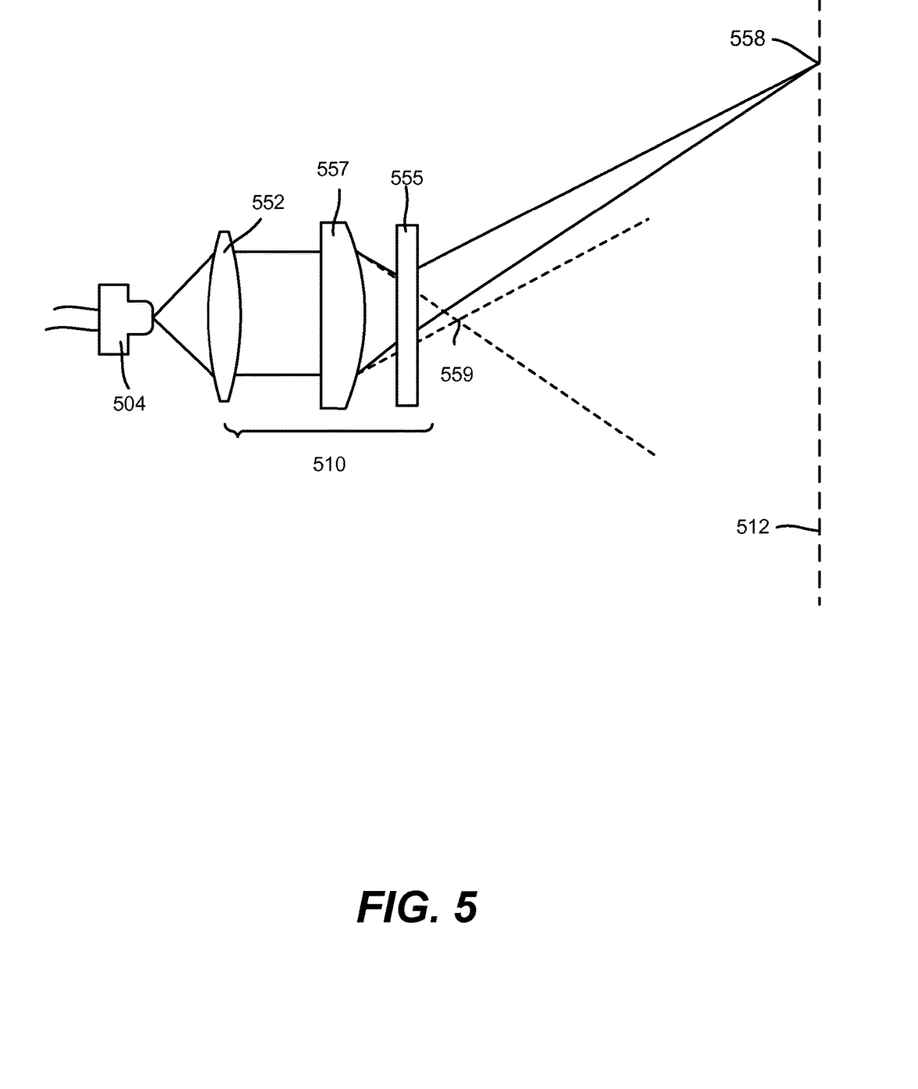
FIG. 5 is a representation of an arrangement of optical-related components, including an upstream positive lens relative to a diffractive optical element, in which the arrangement outputs a diffracted light pattern while expanding non-diffracted light based upon focusing, according to one example implementation.

FIG. 5 shows another alternative embodiment, comprising an arrangement 510 in which an upstream positive lens 557 focuses light such that the diffracted light's focusing is canceled by a downstream diffractive optical element 555, but the non-diffracted light's focusing is not canceled. Similar to FIG. 4, at a point 559, the zero-order light is able to be blocked. Via the canceling, the diffracted light dots each converge at the image plane 512, as represented by the dot 558.

Figure 6:
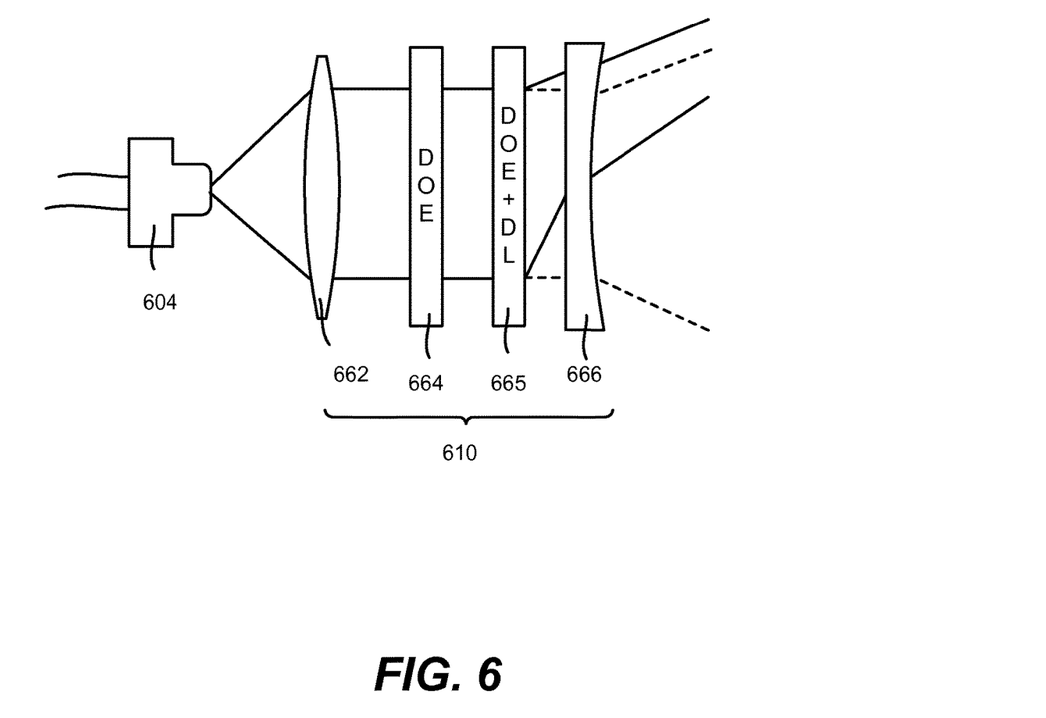
FIG. 6 is a representation of an arrangement of optical-related components, including a plurality of diffractive optical elements in series and a downstream negative lens, in which the arrangement outputs a diffracted light pattern while expanding non-diffracted light based upon focusing, according to one example implementation.

The technology described herein is compatible with existing diffractive optical element technology. For example, as represented in FIG. 6, two (or more, up to any practical number of) diffractive optical elements 664 and 665 may be arranged in series. Unlike the existing technology, the last in the series (relative to the laser 604) may be encoded with a diffractive lens to defocus diffracted light for refocusing with a ROE, that is, for canceling out the effect on diffracted light dots. As before, the diffracted light is unaffected after passing through the ROE, whereby the non-diffracted light is defocused. Note that the last DOE in the series contains the diffractive lens so as to not focus the light before the last diffractive optical element in the series is reached.

Note that FIG. 6 shows an arrangement 610 similar to FIG. 2 but for the two diffractive optical elements 666 and 666 in series. Thus, a collimating lens 662 provides the parallel rays to the first diffractive optical element 664, which diffracts the diffracted light with its pattern into the next diffractive optical element 666 that further diffracts and converges the diffracted light for diverging by the downstream negative lens 666. Notwithstanding, it is understood that two or more diffractive optical elements may be arranged in a given configuration, and that the various diffractive optical elements and ROE may be positioned in other ways. For example, an arrangement may have two or more diffractive optical elements arranged similar to (the single element in) FIG. 3 with an upstream negative lens, or similar to (the single elements in) FIGS. 4 and 5 with respective downstream and upstream positive lenses. An arrangement may have a ROE positioned between two diffractive optical elements, and so forth; as used herein diffractive optical elements "in series" include optically coupled elements, whether directly in series or indirectly in series with one or more intermediary components in between.

Further, it should be noted that any of the diffractive optical elements/ROEs shown herein may be further divided into more diffractive optical elements/ROEs than those illustrated, and/or combined into a lesser number. For example, two or more ROEs may be used in a given arrangement. A single diffractive optical element (e.g., a unitary construction/assembly) with canceling positive and negative focusing of diffracted light may be used, with only negative or positive focusing (but not both that cancel) of the non-diffracted light. Thus, as used herein, "optically coupled" refers to passing light between separate optical components, and/or between different optical sub-components of a single component, regardless of the order of any components or any intermediary elements.

Further, it should be noted that reflective optical elements may be used in addition to, or instead of, refractive optical elements in the manner described above in order to introduce aberrations that cancel, or substantially cancel the aberrations intentionally introduced by the diffractive optical element.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple components can share the performance of one or more functions described herein, and similarly, such functionality may be effected across a plurality of devices. Accordingly, the invention is not to be limited to any single embodiment, but rather is to be construed in breadth, spirit and scope in accordance with the appended claims.

What is claimed is:

1. A system comprising:
   a diffractive optical element (DOE) set comprising one or more optical elements, the DOE set configured to diffract light from a light source that passes through the DOE set into a pattern of diffracted light, the DOE set further configured to aberrate the diffracted light, the DOE being a positive DOE; and
   a refractive optical element (ROE) separate from the DOE set, the ROE being a negative ROE, the ROE configured to:
   aberrate the diffracted light to cancel or substantially cancel aberration of the diffracted light received from the DOE set; and
   aberrate, to an eye safe level, light passed through the DOE that is not diffracted by the DOE by enabling a width of the non-diffracted light to be kept at or above a threshold width.

2. The system of claim 1 wherein the DOE set comprises a DOE encoded with a diffractive lens.

3. The system of claim 1 wherein the ROE is downstream, relative to a light source, of the DOE set.

4. The system of claim 1 wherein the ROE is upstream, relative to a light source, of the DOE set.

5. The system of claim 1 wherein the ROE comprises a negative ROE configured to diverge the non-diffracted light.

6. The system of claim 1 wherein the DOE set comprises a plurality of separate diffractive optical elements arranged in series.

7. The system of claim 1 wherein the light source comprises a laser, the laser optically coupled to a collimating lens, the collimating lens optically coupled to the DOE set.

8. The system of claim 1 wherein the light source outputs infrared light.

9. The system of claim 1 wherein the DOE set and the ROE are incorporated into a projection device that outputs a spot pattern of diffracted light.

10. The system of claim 9 wherein the spot pattern of diffracted light is detected by a stereo camera set.

11. The system of claim 1 wherein the non-diffracted light is refracted by the ROE to defocus to the eye safe level before reaching a physical barrier.

12. The system of claim 1 wherein the non-diffracted light is refracted to defocus to the eye safe level by reflecting the non-diffracted light over a defined distance before outputting the non-diffracted light from a device.

13. The system of claim 1 wherein a size of one or more of the following is based upon an eye safety limit: the ROE, and at least one DOE of the set.

14. The system of claim 1 wherein a strength of the ROE and a strength of at least one DOE of the set is based upon an eye safety limit.

15. A system comprising:
   a projection mechanism, the projection mechanism configured to output a pattern of diffracted light spots and to defocus non-diffracted light output therefrom, the projection mechanism comprising optically coupled components including:
   a laser light source;
   a collimating lens;
   a diffractive optical element set comprising at least one diffractive element with an encoded diffractive lens, the diffractive optical element configured to output the pattern of the diffracted light spots and pass the non-diffracted light that is not diffracted; and
   a refractive optical element (ROE) configured to defocus the non-diffracted light received from the diffractive optical element set and to cancel or substantially cancel the defocusing of the diffracted light spots received from the diffractive lens.

16. The system of claim 15 wherein the projection mechanism is incorporated into a device containing a stereo camera set configured to detect the diffracted light spots.

17. A system comprising:
   a diffractive optical element (DOE) set;
   a refractive optical element (ROE) optically coupled with the DOE set, the ROE configured to:
   receive, from the DOE set, non-diffracted light that was not diffracted by the DOE set;
   defocus the non-diffracted light; and
   cancel or substantially cancel aberration of diffracted light received from the DOE set.

18. The system of claim 17 wherein the diffractive optical element set comprises a diffractive optical element encoded with a diffractive lens.

19. The system of claim 17 wherein the ROE comprises a negative ROE configured to diverge the non-diffracted light.

20. The system of claim 17 wherein the ROE is downstream, relative to a light source, and separate from the diffractive optical element set.

* * * * *